US008126261B2

(12) United States Patent
Medioni et al.

(10) Patent No.: US 8,126,261 B2
(45) Date of Patent: *Feb. 28, 2012

(54) 3D FACE RECONSTRUCTION FROM 2D IMAGES

(75) Inventors: Gerard Medioni, Los Angeles, CA (US); Douglas Fidaleo, San Diego, CA (US)

(73) Assignee: University of Southern California, Los Angeles, CA (US)

(*) Notice: Subject to any disclaimer, the term of this patent is extended or adjusted under 35 U.S.C. 154(b) by 1121 days.

This patent is subject to a terminal disclaimer.

(21) Appl. No.: 11/828,214

(22) Filed: Jul. 25, 2007

(65) Prior Publication Data

US 2008/0152213 A1 Jun. 26, 2008

Related U.S. Application Data

(63) Continuation of application No. 11/669,099, filed on Jan. 30, 2007, now Pat. No. 7,856,125.

(60) Provisional application No. 60/764,007, filed on Jan. 31, 2006.

(51) Int. Cl.
G06K 9/00 (2006.01)

(52) U.S. Cl. .................... 382/154; 382/118; 382/294

(58) Field of Classification Search .................. 382/118, 382/154, 294
See application file for complete search history.

(56) References Cited

U.S. PATENT DOCUMENTS

| 4,710,873 A | 12/1987 | Breslow et al. |
| 5,327,521 A | 7/1994 | Savic et al. |
| 5,821,943 A | 10/1998 | Shashua |
| 6,044,168 A * | 3/2000 | Tuceryan et al. ............. 382/118 |
| 6,047,078 A * | 4/2000 | Kang .............................. 382/107 |
| 6,078,701 A * | 6/2000 | Hsu et al. ...................... 382/294 |
| 6,141,060 A | 10/2000 | Honey et al. |
| 6,283,858 B1 | 9/2001 | Hayes, Jr. et al. |
| 6,313,835 B1 | 11/2001 | Gever et al. |
| 6,331,861 B1 | 12/2001 | Gever et al. |
| 6,350,199 B1 | 2/2002 | Williams et al. |
| 6,400,828 B2 * | 6/2002 | Covell et al. .................. 382/100 |
| 6,425,825 B1 | 7/2002 | Sitrick |
| 6,492,990 B1 | 12/2002 | Peleg et al. |
| 6,496,598 B1 * | 12/2002 | Harman ........................ 382/154 |

(Continued)

FOREIGN PATENT DOCUMENTS

JP 2003-30684 1/2003

(Continued)

OTHER PUBLICATIONS

Building 3-D human face models form two photographs, Chen et al, Journal of VLSI signal processing, vol. 27, 2001, pp. 127-140.*

(Continued)

*Primary Examiner* — Jayesh A Patel

(74) *Attorney, Agent, or Firm* — Knobbe, Martens, Olson & Bear LLP

(57) ABSTRACT

A 3D face reconstruction technique using 2D images, such as photographs of a face, is described. Prior face knowledge or a generic face is used to extract sparse 3D information from the images and to identify image pairs. Bundle adjustment is carried out to determine more accurate 3D camera positions, image pairs are rectified, and dense 3D face information is extracted without using the prior face knowledge. Outliers are removed, e.g., by using tensor voting. A 3D surface is extracted from the dense 3D information and surface detail is extracted from the images.

20 Claims, 3 Drawing Sheets

U.S. PATENT DOCUMENTS

| | | | |
|---|---|---|---|
| 6,539,354 B1 | 3/2003 | Sutton et al. | |
| 6,556,196 B1 * | 4/2003 | Blanz et al. | 345/419 |
| 6,559,845 B1 | 5/2003 | Harvill et al. | |
| 6,807,290 B2 * | 10/2004 | Liu et al. | 382/118 |
| 6,816,159 B2 | 11/2004 | Solazzi | |
| 6,894,686 B2 | 5/2005 | Stamper et al. | |
| 6,919,892 B1 | 7/2005 | Cheiky et al. | |
| 6,954,498 B1 | 10/2005 | Lipton | |
| 6,975,750 B2 * | 12/2005 | Yan et al. | 382/118 |
| 6,999,073 B1 | 2/2006 | Zwern et al. | |
| 7,016,824 B2 | 3/2006 | Waupotitsch et al. | |
| 7,027,054 B1 | 4/2006 | Cheiky et al. | |
| 7,103,211 B1 * | 9/2006 | Medioni et al. | 382/154 |
| 7,123,263 B2 | 10/2006 | Harvill | |
| 7,137,892 B2 | 11/2006 | Sitrick | |
| 7,184,071 B2 * | 2/2007 | Chellappa et al. | 348/46 |
| 7,212,664 B2 * | 5/2007 | Lee et al. | 382/154 |
| 7,218,774 B2 * | 5/2007 | Liu | 382/154 |
| 7,224,357 B2 | 5/2007 | Chen et al. | |
| 7,285,047 B2 | 10/2007 | Gelb et al. | |
| 7,355,607 B2 | 4/2008 | Harvill | |
| 7,415,152 B2 * | 8/2008 | Jiang et al. | 382/154 |
| 7,657,084 B2 * | 2/2010 | Ives et al. | 382/155 |
| 7,697,787 B2 | 4/2010 | Illsley | |
| 7,706,602 B2 * | 4/2010 | Nakashima | 382/154 |
| 7,755,619 B2 * | 7/2010 | Wang et al. | 345/419 |
| 7,856,125 B2 | 12/2010 | Medioni et al. | |
| 7,907,774 B2 * | 3/2011 | Parr et al. | 382/154 |
| 7,929,775 B2 * | 4/2011 | Hager et al. | 382/224 |
| 2001/0020946 A1 * | 9/2001 | Kawakami et al. | 345/582 |
| 2002/0031252 A1 * | 3/2002 | Rozin | 382/154 |
| 2002/0164068 A1 * | 11/2002 | Yan | 382/154 |
| 2003/0007700 A1 | 1/2003 | Gutta et al. | |
| 2003/0063794 A1 * | 4/2003 | Rubinstenn et al. | 382/154 |
| 2003/0091226 A1 * | 5/2003 | Cahill et al. | 382/154 |
| 2003/0123713 A1 * | 7/2003 | Geng | 382/118 |
| 2004/0041804 A1 * | 3/2004 | Ives et al. | 345/419 |
| 2004/0051783 A1 * | 3/2004 | Chellappa et al. | 348/46 |
| 2004/0070585 A1 | 4/2004 | Papiernik et al. | |
| 2004/0085324 A1 * | 5/2004 | Yao | 345/581 |
| 2004/0208344 A1 * | 10/2004 | Liu et al. | 382/118 |
| 2004/0223630 A1 | 11/2004 | Waupotitsch et al. | |
| 2004/0223631 A1 | 11/2004 | Waupotitsch et al. | |
| 2005/0063582 A1 * | 3/2005 | Park et al. | 382/154 |
| 2005/0111705 A1 | 5/2005 | Waupotitsch et al. | |
| 2005/0135670 A1 * | 6/2005 | Vaidyanathan | 382/154 |
| 2005/0162419 A1 * | 7/2005 | Kim et al. | 345/419 |
| 2005/0226509 A1 | 10/2005 | Maurer et al. | |
| 2006/0067573 A1 | 3/2006 | Parr et al. | |
| 2006/0126924 A1 | 6/2006 | Liu et al. | |
| 2006/0212353 A1 | 9/2006 | Roslov et al. | |
| 2007/0002057 A1 | 1/2007 | Danzig et al. | |
| 2007/0061328 A1 | 3/2007 | Ramer et al. | |
| 2007/0183653 A1 | 8/2007 | Medioni et al. | |
| 2008/0007567 A1 | 1/2008 | Clatworthy et al. | |
| 2008/0063263 A1 | 3/2008 | Zhang et al. | |
| 2008/0152200 A1 | 6/2008 | Medioni et al. | |
| 2008/0307052 A1 | 12/2008 | Krishnan et al. | |

FOREIGN PATENT DOCUMENTS

| | | |
|---|---|---|
| WO | WO 01/63560 A1 | 8/2001 |
| WO | WO 0163560 A1 * | 8/2001 |

OTHER PUBLICATIONS

Building 3-D human face—photographs, Chen et al. , Journal of VLSI signal processing, vol. 27, 2001, pp. 127-140.*

Estimating 3D camera—structure, Boughorbel at al, Elsevier, 0167-8655, 2003, pp. 327-337.*

Building 3-D human face—photographs, Chen et al., Journal of VLSI signal processing, vol. 27, 2001, pp. 127-140.*

Estimating 3D camera—structure, Boughorbel et al., Elsevier, 0167-8655, 2003, pp. 327-337.*

Constructing Dense Correspondences—Facial change, Mao et al., 1051-4651, ICPR, 2004, pp. 1-5.*

Boughorbel et al., Estimating 3D camera motion without correspondences using a search for the best structure, Pattern Recognition Letters, Elsevier Science B.V., 2003, vol. 24, pp. 327-337.

Blanz, V., et al., "A Morphable Model for the Synthesis of 3D Faces", *SIGGRAPH 1999, Proceedings of the 26$^{th}$ annual conference on Computer graphics and interactive techniques*, pp. 187-194, Jul. 1999.

Chowdhury, A., et al., "Face Reconstruction from Monocular Video Using Uncertainty Analysis and a Generic Model", *Computer Vision and Image Understanding*, 91 (1-2): 188-213, Jul.-Aug. 2003.

Decarlo, D., et al., "The Integration of Optical Flow and Deformable Models with Applications to Human Face Shape and Motion Estimation", *Proc. CVPR'96*, pp. 231-238, 1996.

Fidaleo, D., et al., "An Investigation of Model Bias in 3D Face Tracking", *ICCV International Workshop on Analysis and Modeling of Faces and Gestures*, Beijing, pp. 1-15, Oct. 2005.

Fua, P., "Using Model-Driven Bundle-Adjustment to Model Heads From Raw Video Sequences", *Proc. 7$^{th}$ International Conference on Computer Vision*, vol. 1, pp. 46-53, Sep. 1999.

Ilic, S., et al., "Implicit Meshes for Surface Reconstruction", *IEEE Transactions on Pattern Analysis and Machine Intelligence*, 28(2):328-333, Feb. 2003.

Medioni, G., et al., "Generation of a 3D Face Model from One Camera", *Proc. IEEE Computer Society 16$^{th}$ International Conference on Pattern Recognition*, vol. 3, pp. 667-671, Aug. 2002.

Medioni, G., et al., "Tensor Voting: Theory and Applications", *12eme Congres Francophone AFRIF-AFIS. . . (RFIA)*, 10 pages, Feb. 2000.

Pollefeys, M., et al., "Visual Modeling with a Hand-Held Camera", *International Journal of Computer Vision*, 59(3):207-232, Sep. 2004.

Romdhani, S., et al., "Efficient, Robust and Accurate Fitting of a 3D Morphable Model", *Proc. Ninth IEEE International Conference on Computer Vision(ICCV'03)*, vol. 1, pp. 59-66, Oct. 2003.

Shan, Y., et al., "Model-Based Bundle Adjustment with Application to Face Modeling", *Proc. Eighth IEEE International Conference(ICCV'01)*, vol. 2, pp. 644-651, Jul. 2001.

International Search Report and Written Opinion, International Application No. PCT /US 07/02786, mailed Apr. 17, 2008, 7 pages.

* cited by examiner

3D FACE RECONSTRUCTION FROM 2D IMAGES

CROSS-REFERENCE TO RELATED APPLICATIONS

This application claims priority to U.S. patent application Ser. No. 11/669,099, filed on Jan. 30, 2007, which claims priority to U.S. Provisional Application 60/764,007, filed Jan. 31, 2006. The disclosure of the prior application is considered part of (and is incorporated by reference in) the disclosure of this application.

FEDERALLY SPONSORED RESEARCH OR DEVELOPMENT

The U.S. Government may have certain rights in this invention pursuant to Grant No. HMI-582-04-1-2002.

BACKGROUND

Conventional face reconstruction techniques often use a two dimensional image or images (e.g. digital photographs) of a face to create a three dimensional representation of the face. The representation that is created may be a file, such as an electronic file, indicative of individual characteristics of different faces. The file can then be used, e.g., for facial recognition, animation, or rendering.

The images, once obtained, are often processed based on prior knowledge or assumptions of what faces usually look like. This knowledge is often called "domain knowledge", a "prior model", or more specifically a "generic face". For example, the prior face knowledge may indicate the presence or likely locations of different kinds of facial features, such as eyes, nose, etc. The prior face knowledge may assume that the face is formed of a linear combination of basis face shapes and appearances, camera parameters, lighting parameters, and other known elements, or elements that are susceptible of estimation. These elements can be combined to estimate the likely appearance of a face. More specifically, the domain knowledge may come in the form of a generic face shape defined by an artist or an average face shape computed from a plurality of known face shapes.

One common technique for face reconstruction uses prior face knowledge of a generic face, and possibly a set of face metrics or deformation parameters, throughout the reconstruction process. Another common technique attempts to eschew the use of prior face knowledge and instead uses a purely data-driven approach to reconstruct the face. This can be done, for example, using triangulation of two-dimensional points in multiple images from multiple calibrated cameras. Unfortunately, the former approach may provide unrealistic data, due to the use of the generic face throughout the process. The latter approach requires additional hardware infrastructure which is difficult to practically implement at a reasonable cost. A single-camera purely data-driven approach alleviates some of the hardware constraints of multi-view stereo methods, but may itself be unstable due to the lack of constraints at stages of the process.

SUMMARY

The present application describes techniques for obtaining three-dimensional face information using an assisted technique. According to aspects, prior knowledge of face structure is used at some points during the processing operation, but other parts during the processing operation are purely data driven.

Another operation uses a single camera for determination of 3D information from a set of 2D images.

DETAILED DESCRIPTION

The general structure and techniques, and more specific embodiments which can be used to effect different ways of carrying out the more general goals, are described herein.

The present application refers to determining three dimensional information about an object, e.g., a face. Although the present embodiment is described with reference to 3D reconstruction and rendering of faces, it should be understood that these same techniques can be used to reconstruct and render multiple views of any object. When used for faces, the three dimensional information produced by the techniques disclosed herein can be used for any face based application, such as animation, recognition, or rendering. The techniques disclosed herein may be more realistic than other techniques that rely more extensively on prior knowledge of generic faces.

The present inventors recognize that previous systems, which used strong prior knowledge of face appearance to reconstruct a face, in effect quantize the number of basis shapes that are used for forming and rendering the face. A strong prior knowledge or generic face approach is effectively limited by the degrees of freedom that are offered by the imposed prior face knowledge or generic face. Hence, the information and subsequent reconstructions do not capture all the subtle details in the original face.

This "face space" quantization is caused because the prior knowledge and associated transformations limit the space of all possible faces that can be reconstructed by the system. Generic face or pure prior face knowledge based methods may not have sufficient degrees of freedom to cover the entire face space.

An embodiment captures subtle face details by disregarding the prior face knowledge or generic face constraints at key points of the process, and instead by relying on the data using a data driven approach to find the details of the face called herein the dense features. The data-driven approach requires large amounts of data to deal effectively with noise, measurement uncertainties, and outliers. However, the present system does not use a purely data-driven approach, but also is assisted by methods that incorporate prior face knowledge or generic faces.

According to one aspect, large amounts of data can be obtained from a single camera that operates to obtain multiple images. For example, this may use frames of video which collectively form a moving sequence of images. It may also be obtained from multiple different still images obtained from one or many cameras.

U.S. Pat. No. 7,103,211 discloses a method for generating 3D face models, that uses no prior face knowledge whatsoever, but rather is completely data driven. The present system uses a system that is mostly data driven, but uses prior face knowledge or a generic face to determine certain parts of the information.

Figure 1:
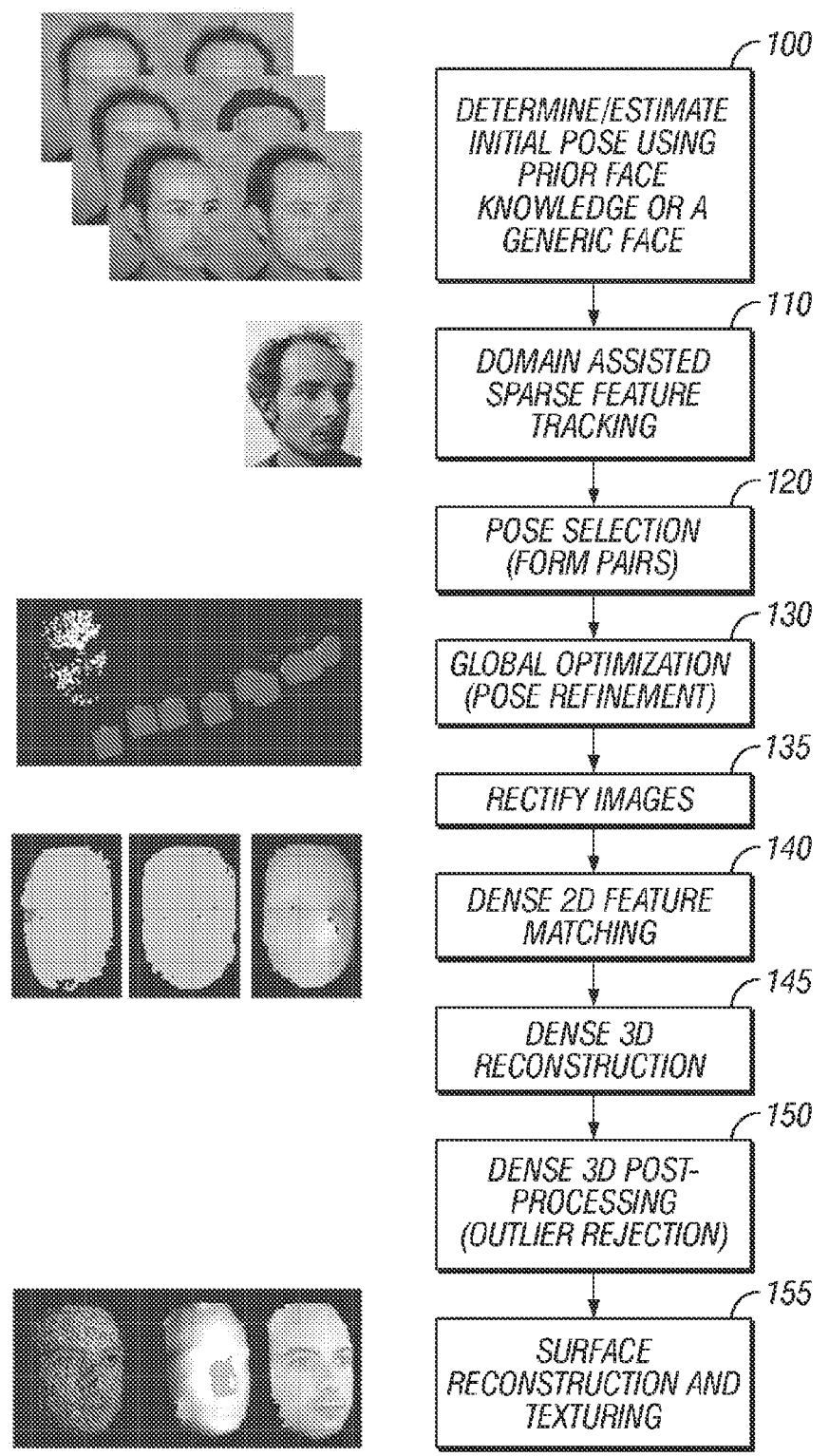
FIG. 1 shows an overall flowchart of the operation.
Figure 2:
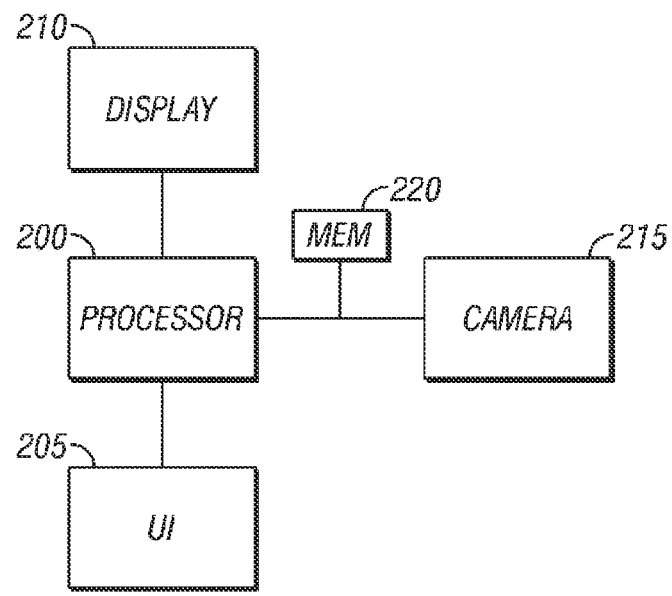
FIG. 2 shows a general purpose computer which can carry out the flowchart.

An embodiment is disclosed with reference to the flowchart of FIG. 1. FIG. 1 also illustrates some exemplary thumbnail images, illustrating the operation. This flowchart can be carried out on any general purpose computer, such as the system shown in FIG. 2. This system includes a processor 200, a user interface such as mouse and keyboard 205, and a display screen 210. The computer can be, for example, an Intel-based processor or any other kind of processor. The computer receives raw or processed image data from one or more cameras 215, e.g. still cameras or video cameras. The processor 200 processes that raw image data according to the descriptions provided herein. As an alternative, the camera information may be stored in a memory 220, e.g. a hard drive, and processed at some later time.

An embodiment extracts information from a sequence of images, e.g. a video sequence, a sequence of stop motion style images from the video sequence, or simply a number of still images. Unless the subject is standing completely still and the camera does not change positions, the sequence of images will have multiple different views of the subject's head in the set of images.

Figure 3:
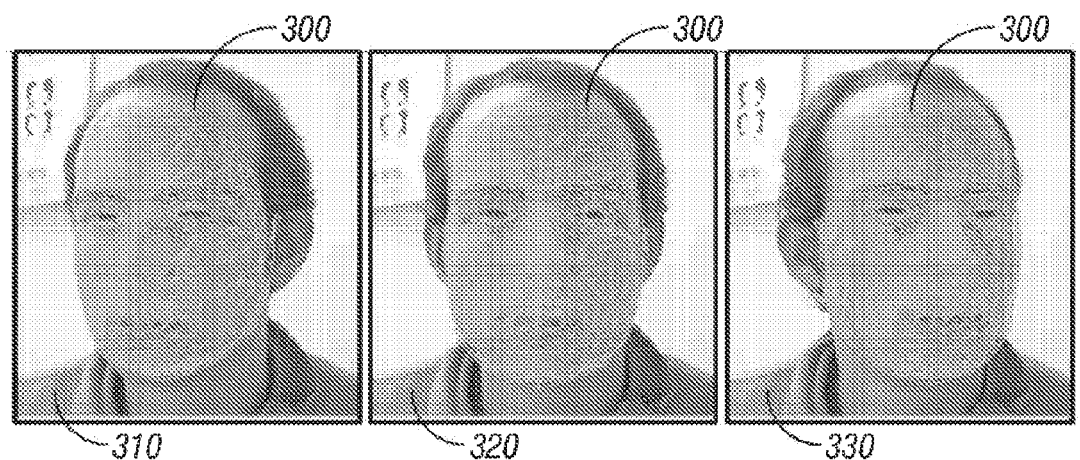
FIG. 3 shows how the three dimensional face tracker is assisted by a generic face.

At 100, an initial pose estimation is determined. This may use a face tracking algorithm, such as that shown in FIG. 3, to derive an initial head pose estimate, and also to derive a mask which represents the look of the face. This uses prior knowledge of face structure to determine the likely position and pose of the head, location of facial features such as nose, mouth, etc, and the like. FIG. 3 illustrates 3 different poses in three different images 310, 320 and 330. The same face mask 300 is superimposed on each of those images. The face mask 300 represents a generic face, and hence has spots for eyes, nose mouth, etc. In this way, the mask helps estimate the pose of the images.

The pose estimation technique passes a set of views to a sparse feature tracking module at 110. The views, which are passed to the module, are those which are believed to be good candidates for image pairs from which three dimensional information can be extracted. The sparse feature tracking module 110 produces a set of feature correspondences for each image pair. The two images in a pair are sufficiently close so that these feature correspondences can be obtained.

Pose selection is carried out at 120, to select those images which properly make a pair that can be used for the determination of 3D information. These pairs should be close in pose and have similar lighting characteristics.

Global optimization is performed over the entire set of feature points at 130. This is used to refine the camera position estimate and compute the three-dimensional structure of the sparse two dimensional features.

The refined camera positions are used to rectify pairs of images at 135, thereby constraining the search space for corresponding feature points to a horizontal scan line in the paired images.

At 140, dense feature matching is performed across the pairs. This finds additional features beyond the sparse detection that was carried out at 110. These correspondences are determined by triangulation using optimized camera poses to form a dense 3-D point cloud or disparity map.

Point clouds corresponding to individual pairs are then merged into a single cloud, and outliers are removed at 145. The dense feature detection is totally data driven, without using prior face knowledge or generic faces. 150 defines dense feature computation aids, used as simplifications to the dense feature matching. This may include outlier rejection techniques (such as tensor voting), and may include area search minimization.

At 155, the final cleaned point cloud is used to form a connected surface. A face texture is acquired from a frontal image. The final result is information representative of the surface. This can be a 3-D mesh formed of triangular patches. The final result can alternately be a set of 3D points or a surface defined for example by curve splines, subdivision surfaces, or other digital surface definitions.

Further details about the operation are now provided.

Conventional stereo reconstruction has relied on the existence of multiple cameras obtaining one or more similar image pairs. Feature correspondences between those multiple image pairs are determined. The feature correspondences are subsequently triangulated to find a final three-dimensional group of points.

In an embodiment, a single camera is used to obtain multiple images, and then the images are recast as multi view stereo images. In an embodiment, the process assumes that the head is static and that the camera is moving or moved with respect to the head. While this is unlikely to be the case, this assumption provides no loss of generality; e.g., the camera can be static and the head moved, or both the camera and the head moved.

As described above, the multiple images are first analyzed at 100 to determine an initial estimate of camera pose among the images. This initial estimate uses information indicative of a face, e.g. prior face knowledge or a generic face, to carry out the estimate. It provides "sparse" information that allows the system to determine enough information to find pose and correspondence between the images.

For example, the initial estimates done with the prior face knowledge or generic face may provide information that indicates the perimeters of a face, the locations of a mask defining parts of the face, or other information. This provides information for image selection, and constrains the set of sparse features to be matched. Prior face knowledge or a generic face is used to form the sparse features, but the sparse features may be refined using data-driven optimization prior to dense features being determined.

The tracker pose estimation module investigates the images to find similar images that can be rectified against one another. The similar images comprise images which define similar poses. This hence allows selection of a subset of images to be used for reconstruction. The images are selected using both the baseline information, as well as reliably tracked feature points across multiple images.

There is always a measurement uncertainty between multiple different images. For example, as the angular baseline between a pair of images decreases, the error in the computed 3-D points is magnified. This decreased angular baseline hence increases 3-D measurement uncertainty. Less accurate 3D information can be obtained from images with smaller angular baselines between the images. As the angular baseline increases, more accurate 3D information can be extracted—however, there is also less surface area in common between the two views, and hence fewer possible matches. Image pairs are therefore selected to balance between the measurement uncertainty, and the number of errors. For example, images with 8 to 15 degrees of angular baseline and 6 points matched across the image pair, may be preferred.

The balancing may be carried out by tracking feature points in multiple selected images. Only images which have high confidence matches (e.g., greater than 90%) between features are retained to establish feature chains. Frame pairs are maintained within the set of images if they meet the feature points and also meet a set baseline criteria. For example, the baseline criteria can be set—such as requiring at least 5 degrees of angular baseline. The feature point criterion also rejects frames that have highly inaccurate tracker pose estimates.

This sparse matching phase produces a set of images and feature points that are matched across the sequence. Matches that are supported by this feature point matching are likely to be more accurate than matches which are solely predicted by the pose tracker. Feature point matches may also cover a greater number of frames than the tracker predicted matches—and hence provide more constraints on the camera pose refinement process. These constraints may result in greater accuracy in the pose refinement at 130.

The bundle adjustment starts with the sets of images and feature points that are matched across the image set. These have been obtained, as described above, by the feature tracking. The bundle adjustment which is carried out at 130 is an optimization technique that solves for the camera parameters and for the 3-D positions of points based on two-dimensional correspondences between sets of images. The optimized parameters may include position and orientation of the camera and 3-D structure of the 2-D feature points. The optimization may be carried out by alternating a partial solution for structure, and then a partial solution for camera pose. A computer may alternatively carry out both of these calculations until an adequate solution converges.

Bundle adjustment hence estimates the position of the camera in each image, by flip-flopping between estimating the pose of cameras and the position of points in an iterative fashion until it finally converges. The end result is a more accurate camera position as well as structure of the points. Because these are sparse "high confidence" points, it does not provide a full dense representation, but that is done in later stages.

An alternative technique may simply iteratively change the values until good values are obtained.

The 3-D locations of the matched feature points as estimated and refined bundle adjustment 130 are used in the later stages to constrain the scope of the reconstruction. These form optimized camera poses that are used in all subsequent processing stages.

Dense feature matching 140 finds more information about corresponding points among the image pairs. An unconstrained dense matching, however, can be computationally prohibitive, since it can require a full image search for each match. An unconstrained search would compare each point in each image against each point in every other image.

150 generically represents the techniques that are used to reduce the scope of the dense feature search.

According to an embodiment, an epipolar geometry technique is used. In epipolar geometry, each correspondent item must lie along a single line that extends between the paired or clustered images. The process can be further simplified by rectifying the images, such that each epipolar line coincides with a horizontal scan line. This avoids the need to re-sample the images for each potential match.

After the rectification, corresponding points in each pair of images are found using a matching process. The prior face knowledge or generic face may be used to assist the matching process by restricting the matching to the area covered by the tracking face mask. This allows simplifying the search such that a template is extracted using a fixed window size for each pixel in one image. The template is matched along the corresponding epipolar line in the paired image.

A minimum correlation threshold and restricted disparity range suitable for faces is used to reduce the number of spurious matches. Locations with a flat correlation plot or no obvious peak are rejected. However, multiple candidate matches may be maintained to find the best match.

The result of the matching process is a disparity volume. Each (x,y,d) triplet maps a pixel (x,y) in one rectified image to a pixel (x+d,y) in a paired image.

The known poses can be triangulated to convert disparity values to three dimensional points. Each disparity pixel is transformed to its original image space using the inverse of the rectifying transform. The three-dimensional location of that match is provided by the intersection between the rays passing through the camera's optical center and the corresponding feature matches in the image plane. In reality, errors in the feature matching and camera estimates will prevent these lines from intersecting exactly. The three-dimensional point that minimizes the orthogonal distance between the rays may be used.

Another constraint may be provided by rejection of outliers in the derived structure. The three-dimensional result from the bundle adjustment process provides a more accurate, though sparse, estimate of the three-dimensional face structure. This is not sufficient to capture the subtle geometry of the face. In an embodiment, this is used to provide a constraint on the allowable three-dimensional computations in the dense reconstruction. Specifically, the computed structure should not deviate far from the bundle-adjustment-derived structure. This structure is first used to prefilter the data by converting the interpolated bundle-adjusted structure to voxels, and rejecting data at a predetermined distance from the voxels. In effect, this becomes a data optimization technique.

The voxel testing removes the gross outliers, that is those which are more than a predetermined distance from the bundle voxels. It also removes boundary artifacts that are due to inaccurate placement of the face mask. Errors in feature matching, however, may result in reconstruction noise. If the noise is uncorrelated within the views and between the views, it will appear as sparse, high frequency variations in the three-dimensional structure. Correct matches however, will be correlated between views due to the smoothness and continuity of the face structure.

Tensor voting may also be used to determine surface saliency and hence to maintain the correlation structure is tensor voting. A three-dimensional tensor voting scheme can be used to reinforce and determine the surface saliency. Tensor voting allows each 3-D point to be encoded as either a ball tensor, or a stick tensor. The information in the tensor is propagated to their neighbors via a voting operation. Neighbors which have similar structure therefore reinforce each other through the tensor voting process. The amount of the structural reinforcement is influenced by the initial structural saliency. This technique recovers a surface from the cloud of points.

A good initial estimate of point normals may be preferred to blindly encoding the points as ball tensors. In an embodiment, the head is approximated by a cylinder as shown in FIG. 4A. Cylinder normals are obtained. The cylinder normals may be used as the point normal approximations.

Figure 4B:
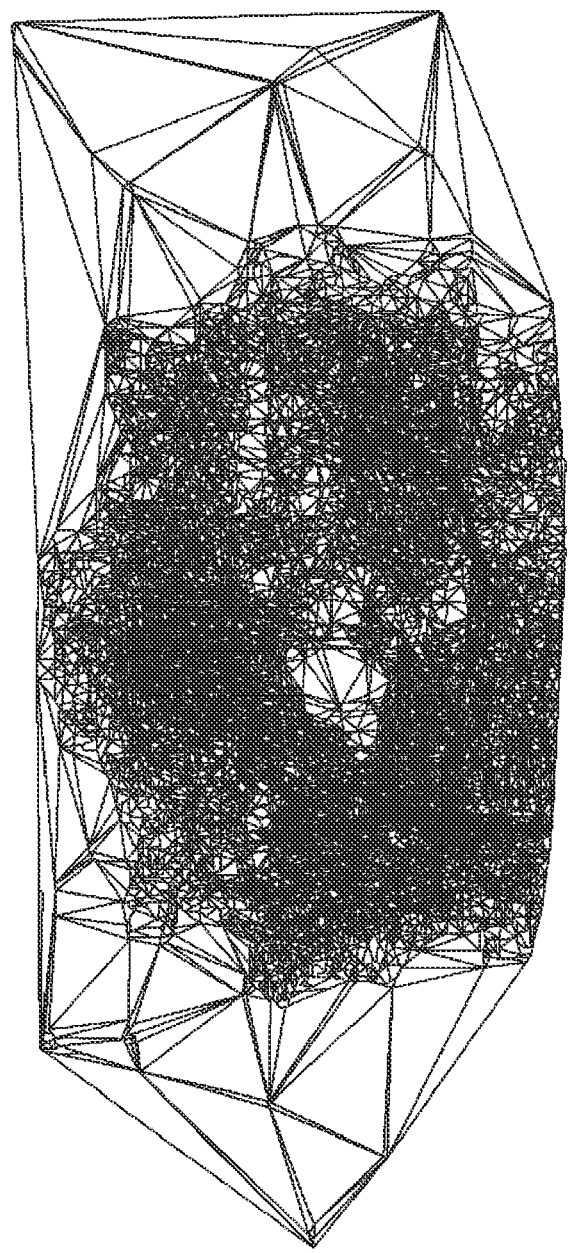
FIGS. 4A and 4B show the dense three dimensional features respectively embedded in a cylindrical space and unwrapped and triangulated.
Figure 4A:
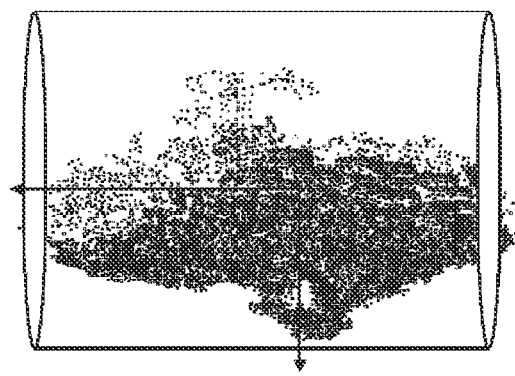

FIG. 4B illustrates the same points unwrapped and triangulated.

In another embodiment, the system may use a 3×3 Eigensystem and may fix the normal as the first eigenvector in that Eigensystem. The remaining basis vectors may then be computed using singular value decomposition. Initial surface saliency, e.g. that defined by the difference in magnitude between the first two eigenvectors, may be set uniformly for all points.

The 3D points obtained from the bundle adjustment are very accurate but sparse estimates of the facial structure. These points are added to the tensor voting point set with boosted surface saliency. Radial basis functions may also be used to interpolate a smooth surface between the 3D points obtained from the bundle adjustment. In this embodiment, normals for the 3D bundle points are computed from the interpolated surface, to use for the tensor voting. However, the interpolated surface itself is preferably not used for the tensor voting.

After two passes of tensor voting, points with low surface saliency are removed, leaving a dense cloud of points distributed across the surface of the face.

Prior face knowledge or a generic face may be introduced in the dense reconstruction stage such that the face space is not constrained. Specifically, an embodiment may use the prior face knowledge or a generic face in the dense process to determine and reject outliers e.g., based on proximity to an existing generic face representation, but is not used to compute or modify the 3D position of reconstructed points.

The face detail is effectively captured in the three-dimensional point cloud. If the final goal is a mathematical description of the face, then the three-dimensional point cloud may be sufficient.

An embodiment uses domain knowledge to generate and texture a mesh based on the dense three-dimensional structure. The embodiment operates to unwrap the 3-D point cloud onto a two-dimensional plane via a cylindrical projection. Following the cylindrical projection, each three-dimensional point cloud has a corresponding two-dimensional map location. The two-dimensional map locations may be triangulated using Delaunay triangulation. Their connectivity information is then transferred to the three-dimensional points, and the surface is defined according to the resulting mesh. The cylindrical unwrapping and triangulation is illustrated in FIG. 4B.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, many of the operations discussed herein refer to operations without using a generic face or prior face knowledge. It should be understood that these techniques alternately can be carried out using such a generic face or prior face knowledge, for some, but not all, of these techniques.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned.

What is claimed is:

1. A face reconstruction method, comprising:
analyzing a plurality of images of a face to find sparse three-dimensional face features using prior knowledge of a face; and using said sparse three-dimensional face features to analyze said plurality of images, finding dense three-dimensional features using a data driven approach without using said prior knowledge of the face.

2. The method of claim 1, wherein said prior knowledge of the face comprises facial features of a generic face.

3. The method of claim 1, further comprising rectifying between pairs of images to find likely image pairs.

4. The method of claim 3, wherein said likely image pairs are image pairs which include an angular baseline that is sufficient to identify three-dimensional information.

5. The method of claim 3, further comprising testing said image pairs to require an angular baseline greater than a first specified amount and to require correspondence between features in the image pairs, wherein said correspondence is greater than a second specified amount.

6. The method of claim 1, further comprising:
analyzing said plurality of images to find image clusters that have feature point matches between the images greater than a specified amount; and
using said image clusters to refine said analyzing carried out using said prior knowledge of the face to form a set of tracked feature points.

7. The method of claim 6, further comprising using said set of tracked feature points to find position and motion of said tracked feature points.

8. The method of claim 1, wherein said finding dense three-dimensional features comprises rejecting outlier portions that are more than a predetermined distance from other features.

9. The method of claim 8, wherein said rejecting outlier portions comprises:
converting data to voxels; and
rejecting data that is more than a predetermined distance from the voxels.

10. A face reconstruction system, the system comprising:
a camera configured to obtain a plurality of images of a face; and
a processing part configured to analyze said plurality of images to find sparse three-dimensional face features using prior knowledge of a face, to use said sparse three-dimensional face features to analyze said plurality of images, and to find dense three-dimensional features using a data driven approach, without using said prior knowledge of the face.

11. The system of claim 10, wherein said camera is a still camera.

12. The system of claim 10, wherein said processing part operates using the prior knowledge of the face to identify features in the images and to rectify between pairs of images to find likely image pairs.

13. The system of claim 12, wherein said processing part uses said prior knowledge of the face to identify a face mask representing a generic face.

14. The system of claim 10, wherein said processing part operates to test the likely image pairs to require an angular baseline greater than a first specified amount, and to require correspondence between features in the image pairs which is no greater than a second specified amount.

15. The system of claim 10, wherein said processing part finds dense features by rejecting outlier portions which are more than a predetermined distance from other features.

16. The system of claim 15, wherein said processing part carries out said rejecting using tensor voting.

17. A method comprising:
  analyzing a plurality of images of a face to find sparse three-dimensional face features;
  using the sparse three-dimensional face features to find dense three-dimensional features using a data driven approach without using any prior face knowledge;
  rectifying between pairs of images to find likely image pairs; and
  testing said image pairs to require an angular baseline greater than a first specified amount and to require correspondence between features in the image pairs, wherein said correspondence is greater than a second specified amount.

18. The method of claim 17, wherein said analyzing comprises use of prior face knowledge or a generic face.

19. The method of claim 17, further comprising rejecting outlier portions that are more than a particular distance from other features.

20. The method of claim 17, further comprising extracting a facial surface from said dense three-dimensional features and extracting surface details from said plurality of images.

* * * * *